US010723086B2

(12) United States Patent
Hanko et al.

(10) Patent No.: US 10,723,086 B2
(45) Date of Patent: Jul. 28, 2020

(54) METHOD FOR AUTOMATED PRODUCTION OF A WORKPIECE HAVING A DIAPHRAGM

(71) Applicant: Endress+Hauser Conducta GmbH+Co. KG, Gerlingen (DE)

(72) Inventors: Michael Hanko, Dresden (DE); Thomas Wilhelm, Chemnitz (DE); Bert Blankenburg, Grimma (DE); Carsten Enderwitz, Waldheim (DE); Jens Voigtländer, Waldkirch (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 389 days.

(21) Appl. No.: 15/376,977

(22) Filed: Dec. 13, 2016

(65) Prior Publication Data
US 2017/0165869 A1 Jun. 15, 2017

(30) Foreign Application Priority Data

Dec. 15, 2015 (DE) .......................... 10 2015 121 807

(51) Int. Cl.
  *B29C 65/00*  (2006.01)
  *G01N 27/36*  (2006.01)
  (Continued)

(52) U.S. Cl.
 CPC ...... *B29C 66/7461* (2013.01); *B28B 11/0872* (2013.01); *B28B 17/0072* (2013.01); *B28B 17/0081* (2013.01); *B29C 66/034* (2013.01); *B29C 66/303* (2013.01); *C04B 35/486* (2013.01); *C04B 37/042* (2013.01); *C04B 38/06* (2013.01); *G01N 27/36* (2013.01); *B29C 2035/0838* (2013.01);
 (Continued)

(58) Field of Classification Search
 CPC ..................... B29C 35/045; B29C 2035/0838
 See application file for complete search history.

(56) References Cited

U.S. PATENT DOCUMENTS 5,779,753 A * 7/1998 Vetter .................. B23K 26/032
                 65/105
7,766,213 B2 * 8/2010 Henrikson ........... B23K 9/0956
                 228/103
(Continued)

FOREIGN PATENT DOCUMENTS

CN   1810435 A  8/2006
CN   101080632 A  11/2007
(Continued)

OTHER PUBLICATIONS

Search Report for German Patent Application No. 10 2015 121 807.0, German Patent Office, dated Nov. 21, 2016, 7 pp.

*Primary Examiner* — Atul P. Khare
(74) *Attorney, Agent, or Firm* — Mark A. Logan; Endress+Hauser (USA) Holding Inc.

(57) ABSTRACT

The present invention relates to a method for the automated production of a workpiece having at least one diaphragm, including a workpiece for an electrochemical sensor, including providing a workpiece that has a wall with at least one continuous opening through the wall, wherein a diaphragm body is affixed in the at least one opening, such that the diaphragm body completely fills a cross-section of the opening, and processing the diaphragm body by means of a laser.

15 Claims, 2 Drawing Sheets

(51) Int. Cl.
    *B28B 11/08*     (2006.01)
    *B28B 17/00*     (2006.01)
    *C04B 38/06*     (2006.01)
    *C04B 35/486*     (2006.01)
    *C04B 37/04*     (2006.01)
    *B29C 35/08*     (2006.01)

(52) U.S. Cl.
    CPC .. *C04B 2235/665* (2013.01); *C04B 2237/348* (2013.01); *C04B 2237/76* (2013.01)

(56) References Cited

U.S. PATENT DOCUMENTS

| | | | | |
|---|---|---|---|---|
| 7,902,483 | B2 * | 3/2011 | Eiterer | B23K 26/0604 219/121.7 |
| 8,961,758 | B2 * | 2/2015 | Wilke | G01N 27/333 204/409 |
| 9,696,273 | B2 * | 7/2017 | Wilhelm | G01N 27/301 |
| 2005/0133369 | A1 * | 6/2005 | Sovrano | G01N 27/4035 204/435 |
| 2006/0257996 | A1 | 11/2006 | Simpson et al. | |
| 2009/0236224 | A1 * | 9/2009 | Yamasato | G01N 27/36 204/415 |
| 2013/0161191 | A1 * | 6/2013 | Wilhelm | G01N 27/301 204/406 |
| 2013/0327151 | A1 * | 12/2013 | Berlinger | G01L 9/0075 73/756 |

FOREIGN PATENT DOCUMENTS

| | | | | |
|---|---|---|---|---|
| CN | 101244486 | A | 8/2008 | |
| CN | 102818538 | A | 12/2012 | |
| CN | 104493365 | A | 4/2015 | |
| DE | 10352402 | A1 | 6/2005 | |
| DE | 102007060618 | A1 | 8/2008 | |
| DE | 102008055084 | A1 | 6/2010 | |
| DE | 102009026991 | A1 | 3/2011 | |
| DE | 102013013601 | A1 | 3/2015 | |
| DE | 102013114745 | A1 * | 6/2015 | ............ G01N 27/36 |
| EP | 0853762 | B1 | 7/2003 | |
| EP | 0853762 | B1 | 9/2003 | |
| JP | 7232981 | A | 9/1995 | |
| JP | 08285811 | A * | 11/1996 | |
| WO | 2003033219 | A2 | 4/2003 | |

* cited by examiner

METHOD FOR AUTOMATED PRODUCTION OF A WORKPIECE HAVING A DIAPHRAGM

CROSS-REFERENCE TO RELATED APPLICATION

The present application is related to and claims the priority benefit of German Patent Application No. 10 2015 121 807.0, filed on Dec. 15, 2015, the entire contents of which are incorporated herein by reference.

TECHNICAL FIELD

The present disclosure relates to a method for the automated production of a workpiece, including a glass or plastic body, having at least one diaphragm for an electrochemical sensor, such as a pH sensor or another ion-sensitive sensor.

BACKGROUND

Electrochemical sensors are often used in the laboratory or in process measurement technology to determine and monitor analysis measurands, such as concentrations of certain substances, so-called analytes, or variables dependent upon them. Examples of electrochemical sensors are potentiometric sensors, capacitive sensors, and amperometric sensors.

Potentiometric sensors generally comprise a measuring and a reference half-cell, also called a measuring and a reference electrode respectively. The half-cells can be in the form of a single-rod measuring chain in a common glass or plastic housing; they can, however, also be designed as two separable half-cells having separate glass or plastic housings.

A pH sensor designed as a single-rod measuring chain, in which the measuring half-cell is designed as a pH glass electrode, can have a glass housing with two glass tubes arranged coaxially to one another, wherein the outer glass tube is at one end connected to the inner glass tube so that the outer glass tube is closed at this end. The inner glass tube is closed at this end with a pH-sensitive glass membrane and is used as measuring half-cell housing. The chamber formed between the outer and the inner glass tubes is used as reference half-cell chamber.

The reference half-cell is often designed as an electrode of a second type, which has a reference element that is in contact with a reference electrolyte contained in the reference half-cell chamber. In the outer glass tube of the single-rod measuring chain is arranged a bridge that passes through the tube wall and that can comprise at least one diaphragm. The end region of the sensor that comprises the at least one diaphragm and the glass membrane is intended to be brought into contact with the measuring fluid. An exchange of substances, and thus an electrolytic connection between the reference electrolyte and the measuring fluid, is ensured via the diaphragm.

Such electrodes of the second type that comprise a reference element and an electrolyte in contact with the reference electrolyte, which electrolyte in turn is in contact with the measuring medium via a diaphragm, are also used as reference electrodes in other electrochemical sensors, such as in capacitive sensors that use capacitive field effect structures, for instance in the form of so-called EIS structures ("electrolyte insulator semiconductor"), to detect an analyte in a measuring solution.

Amperometric sensors comprise at least two, and often even three, electrodes. One of the electrodes is used as a working electrode, another as a counter electrode. A current flow between the working and the counter electrodes is used to determine the measurand. In many amperometric applications, the potential of the working electrode or the current flow through the working electrode is regulated to a constant value or a value that changes as a function of time by means of a third reference electrode through which no current flows. The electrodes are electrically conductively connected to a measuring circuit. Depending upon the type and measuring task of the amperometric sensor, the electrodes are immersed directly in the measuring medium or in an inner electrolyte accommodated in a housing. In the design mentioned last, the housing is closed by means of a membrane in a region provided for immersion in the measuring medium, through which membrane the analyte or a reaction product of the analyte can be transported into the inner electrolyte. As reference electrode, an electrode of the second type, for example, can be used that is designed in the same manner as the reference electrode of the previously described potentiometric sensors and thus also comprises a diaphragm used for the exchange of substances between the measuring fluid and the reference electrolyte.

Reference electrodes or reference half-cells can also be accommodated in plastic housings, rather than glass housings; this is, for example, often the case with ISFET sensors. Such a sensor is known from DE 10 2013 013601 A1, for example.

Diaphragms used as an electrolytic bridge of a reference electrode of an electrochemical sensor are often made from a porous ceramic body, such as a zirconium dioxide ceramic. The pores of the ceramic body form a connection, via which the reference half-cell chamber, in which the reference electrolyte is contained, and the surroundings of the housing of the reference half-cell communicate.

Depending upon the sensor type, diaphragms with different properties, such as different pore size and number of pores or pore density, are used. The pore size, pore density, number of pores, and the total cross-section that is provided by the pores and as a result of which a flow of electrolyte and/or measuring fluid is possible via the diaphragm, affect the measurement characteristics and/or the lifetime of the electrochemical sensor. Therefore, the diaphragms used also differ depending upon the specification of the sensor type. If sensors of a specific sensor type are produced only in relatively small quantities, only a small quantity of a ceramic specifically developed and produced for diaphragms of this sensor type is, accordingly, also required. The production and storage of respectively small quantities of specific ceramics are complex and costly. Ensuring, in a serial production, that each sensor type is respectively assigned the diaphragms adapted to it requires a relatively high logistical effort. An automation of the serial production is also complex, since it must be ensured that a device for the automated production of sensors is provided at any time with the diaphragms adapted to the sensor type to be produced at that time.

SUMMARY

It is now the aim of the present invention to specify a method that is improved, with respect to the aforementioned disadvantages of the methods known from the prior art, for the production of a workpiece having at least one diaphragm, including a glass or plastic body, for an electrochemical sensor.

The method according to the present invention is a method for the automated production of a workpiece having at least one diaphragm, including for the production of an electrochemical sensor, which method includes the following steps: providing a workpiece that has a wall with at least one continuous opening through the wall, wherein a diaphragm body is affixed in the at least one opening, such that the diaphragm body completely fills a cross-section of the opening; and processing the diaphragm body by means of a laser.

By subsequently processing the diaphragm body by means of a laser, the properties of the diaphragm body can be changed specifically in order to produce a diaphragm with the specified properties. The diaphragm body can be made from a porous material, such as a porous ceramic. By means of the subsequent processing, the pore size, number of pores, and/or pore density in the diaphragm body can be adapted to the intended later application of an electrochemical sensor, for the production of which the workpiece is used. The adaptation of the pore size can include the adaptation of the size distribution of the pores and the adaptation of the average pore size. Pore size in this respect refers to a pore diameter or a pore cross-section. The processing of the diaphragm body to achieve certain properties makes possible the production of sensors of different sensor types from workpieces with a diaphragm body made of one and the same material, such as a ceramic material. The production or procurement and storage of different materials for different sensor types are thus dispensed with.

The workpieces can, for example, be used for the production of differing electrochemical sensors of the aforementioned type; they can, for example, be further processed as reference half-cells of potentiometric sensors of different types, as reference electrodes of amperometric sensors of different types, or as reference electrodes of capacitive sensors of different types.

The diaphragm body can be firmly bonded, such as melted or glued, into the continuous opening through the wall. The diaphragm body can alternatively also be retained in the opening by means of a force fit or a form fit. In this case, a firmly-bonded connection of the diaphragm body to the wall can be effected during later further processing steps.

The provision of the workpiece can include the temporary fixation of the workpiece in a workpiece holder, wherein, in order to process the diaphragm body by means of the laser, a beam emitted by the laser or a beam bundle emitted by the laser and the workpiece holder are moved relative to one another, so that the beam or the beam bundle strikes at least a section of the diaphragm body. The beam or the beam bundle can be shaped and/or aligned with respect to the diaphragm body by means of optical elements. The beam emitted by the laser or the beam bundle emitted by the laser can be continuous or pulsed.

Traditional production methods for glass or plastic bodies used to house an electrochemical sensor can comprise skilled steps performed manually. During manually-performed, firm bonding of a diaphragm into a wall of a workpiece, the properties of the diaphragm may be altered in a relatively uncontrolled manner, depending upon the skill of the processor. Such changes in the properties of the diaphragm can result in a large variation in the properties of the produced electrochemical sensor. The method according to the present invention makes it possible, after affixing the diaphragm body in the wall of the workpiece, to change the properties of the diaphragm body specifically, by processing it in such a manner that individual variations are reduced. Imaging methods can be used for this purpose.

In one embodiment, the position of the at least one diaphragm body can be detected optically. The optical detection of the position of the diaphragm body can, for example, include the following steps: detecting image data of a region of the wall including the diaphragm body by means of an image acquisition device; analyzing the image data by means of an electronic data processing unit that is designed to determine, based upon the image data, a position and/or orientation of the diaphragm body with respect to a specified coordinate system.

The image data can be acquired by means of a digital camera. The digital camera can be connected to the data processing unit, such that the data processing unit can read and further process the image data. The data processing unit can be used as a control unit for controlling the processing of the diaphragm body by means of the laser. For this purpose, it can be connected to the laser, to control the emission of the radiation.

In an alternative embodiment, the position and/or orientation of the diaphragm body with respect to the wall of the workpiece can be detected by means of the analysis of the image data. This makes it possible to detect production-related variations in the orientation of the diaphragm body with respect to the wall in serially-produced workpieces and to correct them by means of laser processing, if necessary. A region of the diaphragm body that protrudes too far beyond the wall of the workpiece can, for example, be cut off by means of the laser.

In order to process the diaphragm body by means of the laser, the diaphragm body and the beam or the beam bundle can be moved relative to one another, based upon the determined position and/or orientation of the diaphragm body with respect to the specified coordinate system. For this purpose, the workpiece holder can, for example, be moved by means of a controllable drive. Alternatively or additionally, the beam or the beam bundle of the laser can be moved by, for example, moving one or more optical elements that shape and/or align the beam or the beam bundle, by means of one or more controllable drives.

In case the data processing unit described above is used as a control unit for controlling the processing of the diaphragm body by means of the laser, the data processing unit can be connected to the drives and operate them to control the processing of the diaphragm body. For this purpose, it can use the information determined, based upon the image data, as to the position of the diaphragm body, and possibly additional data.

The diaphragm body can be made from a ceramic having pores, wherein the processing by means of the laser includes: introducing energy by means of the beam or beam bundle emitted by the laser into at least a section of the diaphragm body, in order to reduce a total volume of the pores, a number of the pores, and/or an average cross-section of the pores, at least in the section.

The ceramic can, for example, be a ceramic containing zirconium dioxide. The ceramic can possibly contain additional oxides.

In an alternative embodiment, in which the diaphragm body is made from a ceramic, the processing by means of the laser can include: introducing energy by means of the beam or beam bundle emitted by the laser into at least a section of the diaphragm body and forming and/or enlarging cavities, pores, and channels, within the section of the diaphragm body.

In the two embodiments, the energy introduced can be dimensioned such that the diaphragm body in the processed section is heated to a temperature in the range of the sintering temperature or above the sintering temperature of the ceramic material from which the diaphragm body is made.

In another embodiment, the diaphragm body can include slip or a generic ceramic precursor material. Such a diaphragm body can be easily malleable and can therefore be fitted well into the continuous opening of the wall. In this embodiment, the processing by means of the laser can include the sintering of the diaphragm body to form a ceramic from the slip or the ceramic precursor material.

As already mentioned, the diaphragm body can also be cut to a specified length by means of the laser.

The diaphragm body can additionally include one or more materials that facilitate the processing by means of the laser. These materials can, for example, be materials that absorb the radiation of the laser and convert it into thermal energy, so that the heating of the diaphragm body by means of the laser is enhanced. Alternatively or additionally, the diaphragm body can comprise materials that melt during the irradiation using the laser and, in the liquid state, find their way into the pores of the diaphragm body and thus reduce the cross-section of the pores. It is also possible for the pores of the ceramic material of the diaphragm body to be filled with a material that, when irradiated using the laser, becomes liquid or transitions into the gas phase, so that the irradiation results in the formation and/or enlargement of the pores of the diaphragm body.

Under the influence of the laser processing, a chemical modification of the diaphragm body, or a chemical modification of inner pore surfaces of the diaphragm body, is effected, and/or an electron conductivity of the diaphragm body is produced by one or more materials contained additionally in the diaphragm body.

In another embodiment, the processing by means of the laser can include the application of a coating to a surface of the diaphragm body and/or to at least a section of the inner pore surfaces of the diaphragm body by, for example, laser ablation. For this purpose, a beam emitted by the laser or a beam bundle emitted by the laser can, for example, be directed toward a target that is arranged in the vicinity of the diaphragm body and on the surface of which material is evaporated as a result of the energy input by the laser radiation, said material being deposited on the surface of the diaphragm body to be coated.

The workpiece can, for example, have at least one tube, wherein the wall is a tube wall surrounding a lumen. The wall can have several continuous openings, in which a diaphragm body is respectively firmly bonded such that it fills the cross-section of the respective opening. Some or all of the diaphragm bodies can be processed by means of the laser. In this embodiment, in addition to the tube, the workpiece can have an inner tube extending inside the tube, wherein the inner tube and the tube are arranged coaxially, and wherein one end of the inner tube is firmly bonded to or fused with a tube wall of the tube. Such a workpiece can, for example, be used for the production of a potentiometric, single-rod measuring chain, wherein the tube can be used as housing of the measuring half-cell, and the annular chamber formed between the tube and the inner tube can be used as housing of the reference half-cell.

The device according to the present invention for the automated production of a workpiece having a diaphragm for an electrochemical sensor by means of the method according to one of the previously described embodiments includes: a workpiece holder for a workpiece that has a wall with at least one continuous opening through the wall, wherein a diaphragm body is affixed in the at least one opening, such that the diaphragm body completely fills a cross-section of the opening; a laser that is designed to emit a beam or a beam bundle; and an electronic control unit that is designed to control the laser for emitting the beam or the beam bundle and that is further designed to process the diaphragm body by means of the laser.

The beam or the beam bundle of the laser and the workpiece holder can be capable of moving relative to one another, in order to process the diaphragm body by means of the beam or the beam bundle, wherein the control unit is designed to control the relative movement between the beam or the beam bundle and the workpiece holder.

As already mentioned in connection with the method, the diaphragm body can be firmly bonded, such as melted or glued, into the continuous opening through the wall. The diaphragm body can, alternatively, also be retained in the opening by means of a force fit or a form fit. In this case, a firmly-bonded connection of the diaphragm body to the wall can be effected during later further processing steps.

The device can further include an image acquisition device that is designed to determine image data of the workpiece accommodated in the workpiece holder and to output the image data or data derived therefrom to the control unit.

The control unit can be designed to determine, based upon the image data, a position and/or orientation of the diaphragm body with respect to a specified coordinate system and/or with respect to the wall of the workpiece.

The control unit can be designed to control a relative movement between the beam or the beam bundle and the workpiece holder with respect to the specified coordinate system. The workpiece holder can be connected to a drive for moving the workpiece holder. The control unit can be connected to the drive such that it can operate the drive and control the movement of the workpiece holder. The device can additionally or alternatively include means, operable by the control unit, for moving the beam or the beam bundle emitted by the laser. The device can, for example, include one or more optical elements that align and/or shape the beam or the beam bundle, in order to strike a certain region of the diaphragm body. The device can additionally include one or more drives, operable by the control unit, for moving the optical element(s), in order to move the beam or the beam bundle relative to the workpiece in a manner specified by the control unit.

BRIEF DESCRIPTION OF THE DRAWINGS

The present invention is explained in further detail below on the basis of the exemplary embodiments shown in the figures. The figures show.

DETAILED DESCRIPTION

Figure 1:
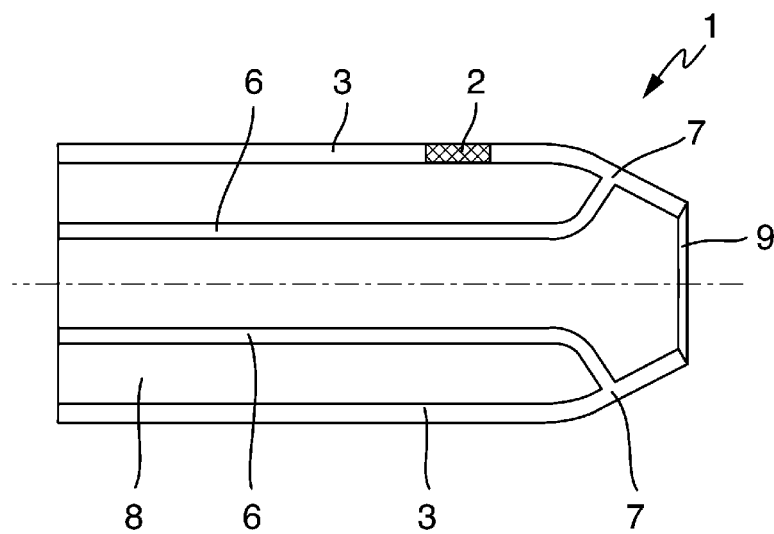
FIG. 1 shows a schematic representation of a workpiece that can be processed further to produce a potentiometric sensor.

FIG. 1 schematically shows a glass assembly 1 that can be processed further to produce a potentiometric sensor, including a pH sensor. The glass assembly 1 has an inner tube 6 and an outer tube 3, which are arranged coaxially with respect to their common axis of rotation Z. In the tube wall of the outer tube 3 is arranged a diaphragm 2 that is firmly bonded to the tube wall of the outer tube 3 by being melted into a continuous opening through the tube wall. The diaphragm 2 is formed by a cylindrical, porous ceramic body made, for example, of a $ZrO_2$ ceramic.

At a connection point 7, the inner tube 6 and the outer tube 3 are melted together. The connection point 7 closes one end of an annular chamber 8 formed between the inner tube 6 and the outer tube 3. The annual chamber 8 communicates with the surroundings of the outer tube 3 via the pores of the diaphragm 2. The inner tube 6 is open at its end 9 located in the region of the connection point 7.

The production of a pH sensor with a glass electrode made of the glass assembly 1 may, for example, be carried out in the following manner: A pH-sensitive glass membrane that closes the inner tube 6 at the front side can be blown onto the front open end 9 of the glass assembly 1. A buffer solution and a potential discharger are then introduced into the inner tube 6. A reference electrolyte and a reference electrode are introduced into the chamber 8 formed between the inner tube 6 and the outer tube 3. The glass assembly 1 can then be closed on the rear side, wherein the reference electrode and the potential discharger are respectively conducted to a contact point that is arranged outside the chambers that are formed in the glass assembly 1 and filled with electrolyte. The contact points of the potential discharger and the reference electrode can be connected to a measuring circuit, which can be arranged in an electronic housing that is connected firmly at the rear side to the glass assembly and that can be designed as, for example, a plug head.

During the measuring operation of the pH sensor, the front end of the sensor, which comprises the membrane and the diaphragm 2, is brought into contact with a measuring fluid. Via the pores of the diaphragm 2, a mass transport between the annular chamber 8, in which the reference electrolyte is contained, and the measuring fluid is possible. The flow of electrolyte through the diaphragm 2 depends upon the properties of the diaphragm 2, e.g., upon the number and size of the pores and upon the length of the diaphragm 2. Depending upon the sensor type and application, different properties of the diaphragm 2 are desired.

Figure 2:
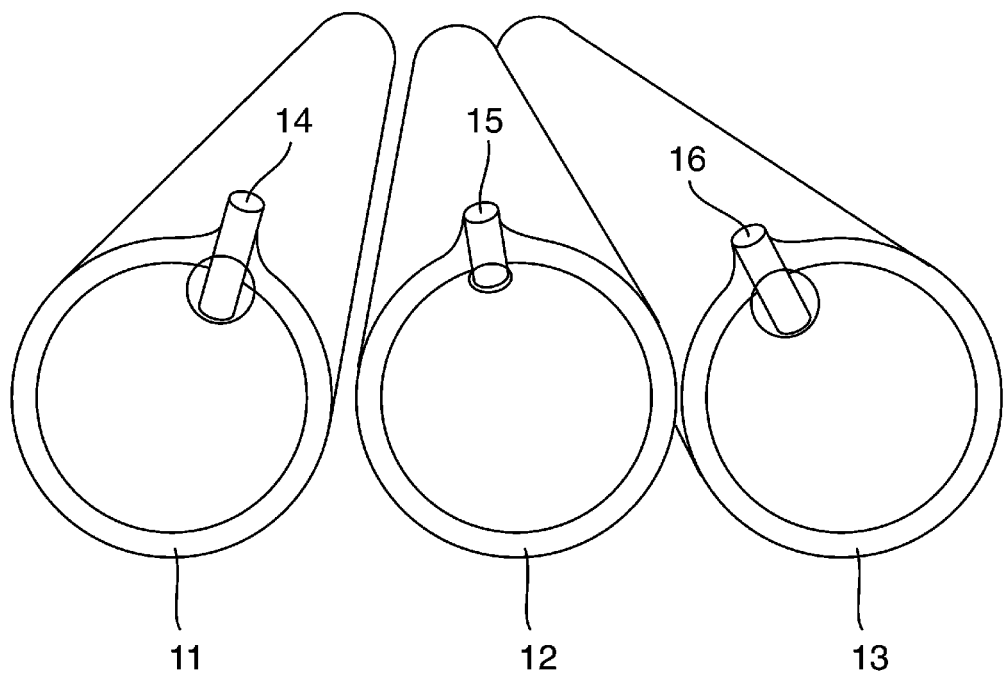
FIG. 2 shows a schematic representation of three tubes, in the tube walls of which is respectively arranged a diaphragm body.

FIG. 2 shows three glass tubes 11, 12, 13, into the walls of which a continuous, rod-shaped diaphragm 14, 15, 16 made of a porous material is respectively firmly bonded by means of a traditional melting process. It can be seen that the diaphragms 14, 15, 16 have different lengths and differently dimensioned surface regions that are in contact with the inside of the tubes 11, 12, 13 and with the surroundings of the respective tubes 11, 12, 13. If the tubes 11, 12, 13 are further processed as housing parts for a reference half-cell of an electrochemical sensor, such as a potentiometric, amperometric, or capacitive sensor, significant differences in the flow of the reference electrolyte and/or measuring fluid through diaphragms 14, 15, 16 result between the reference half-cells made of the tubes 11, 12, 13. A longer diaphragm, such as the two diaphragms 14 and 16, will ensure a lower flow rate (i.e., a lower exchange of substances) than a shorter diaphragm, such as the diaphragm 15. The flow of reference electrolyte and/or measuring fluid through the diaphragm affects the measurement characteristics and the lifetime of a reference half-cell. In the same manner, in addition to the exchange of substances, the charge transport through the diaphragm also depends upon its length. This charge transport affects the diaphragm resistance and the formation of the additional potentials that possibly impair the measurement characteristics. Large variations in the diaphragm properties are thus associated with large individual variations with respect to the measurement characteristics and lifetime of the sensors produced by processing the tubes 11, 12, 13.

Figure 3:
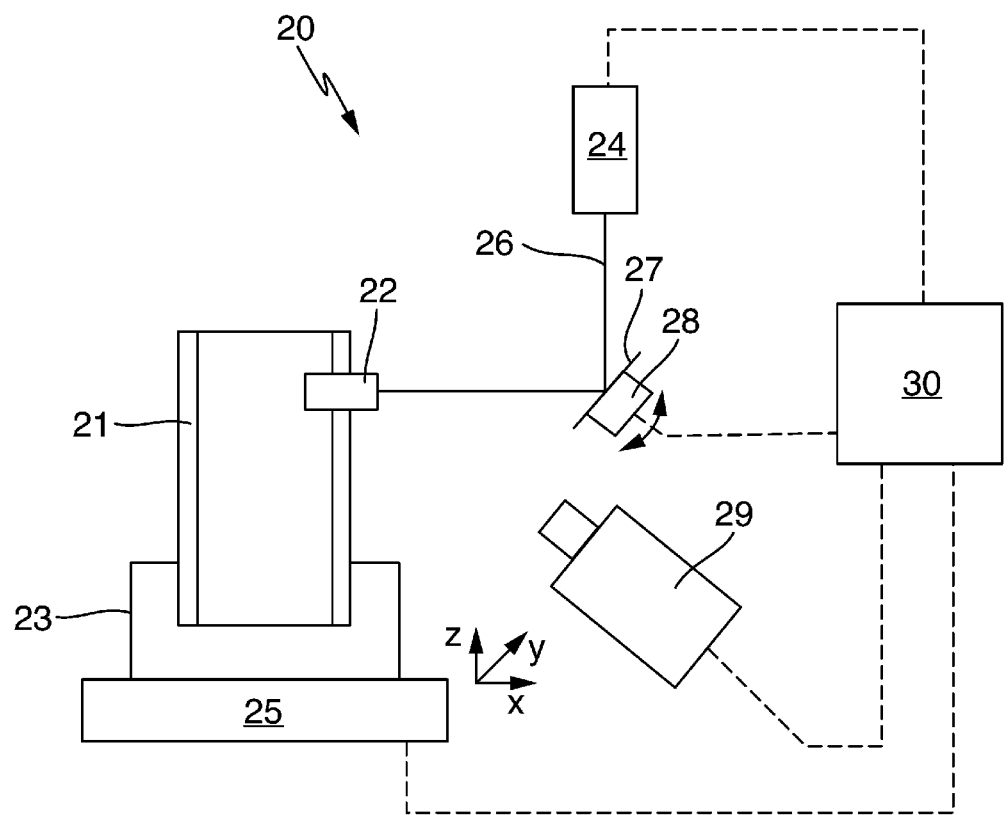
FIG. 3 shows a schematic representation of a device for the automated production of a workpiece, which has a diaphragm, for an electrochemical sensor.

FIG. 3 schematically shows a device 20, which makes possible a processing of a diaphragm body 22 arranged in the wall of a workpiece 21 and made of a porous ceramic, such as a $ZrO_2$ ceramic, which can possibly include additional oxides. In the present example, the workpiece 21 is a glass tube, the tube wall of which has a continuous opening that is completely filled by the diaphragm body. The diaphragm body 22 is melted into the opening. With the device 20, the diaphragm body 22 can be processed subsequently in order to further process said diaphragm body into a diaphragm with the desired properties. This makes it possible, on the one hand, to produce a variety of different sensors of different types, with diaphragms that respectively have different properties adapted to different applications, from workpieces of the same type that respectively have at least one diaphragm body made of one and the same base material. On the other hand, it is possible to compensate for the variations in the properties of the diaphragm body 22 occurring during the firm bonding of the diaphragm body 22 to the wall of the workpieces 21 by means of a subsequent processing and to thus reduce the individual variations occurring as a result of the manual processing steps.

The device 20 comprises a workpiece holder 23, into which the workpiece 21 is clamped. The workpiece holder 23 is connected to a drive 25, by means of which the workpiece holder 23 can be moved in all spatial directions x, y, z.

The device 20 further comprises a laser 24 that is designed to emit a beam bundle 26. The beam bundle 26 can be pulsed or continuous. It is shaped and aligned by means of optical elements, such that it strikes the diaphragm body 22. FIG. 3 schematically shows only the deflection mirror 27 of the optical elements used. The person skilled in the art naturally knows additional means for deflecting and shaping beams that can be used here. The deflection mirror 27 has a drive 28, by means of which the beam bundle can be deflected into one or more directions, in order to process the diaphragm body 22. If the material of the diaphragm body is, for example, a zirconium dioxide ceramic, a wavelength of less than 400 nm or less than 380 nm or less than 320 nm is suitable for processing due to the absorption properties of the zirconium dioxide, in order to subsequently sinter the diaphragm body 22 to affect, for example, its pore structure.

The device 20 further includes a digital camera 29 that is designed to acquire images of the workpiece 21 and the diaphragm body 22. The digital camera 29, the drives 25, 28, and the laser 24 are connected to a central control unit 30. Said control unit includes a processor and a storage means, in which a computer program is stored that is used to control the device 20 in order to process the diaphragm body 22. The control unit 30 also includes input means, such as a keyboard, and output means, such as a display, on which, for example, operational parameters and the images acquired by means of the digital camera 29 can be displayed.

The processing of the diaphragm body 22 by means of the laser 24 can be performed according to the following method:

The workpiece 21 is clamped into the workpiece holder 23. An image of the workpiece 21 with the diaphragm body 22 is acquired by means of the digital camera 29. The image data are recorded and processed further by the control unit 30. Based upon the image data, the control unit 30 determines the position of the diaphragm body 22 with respect to a specified coordinate system, among other things.

In a first method variant, the device 20 can, by processing the diaphragm body 22, be used to produce a diaphragm with properties that are adapted to a specific sensor type and/or a specific application. For this purpose, a sensor type, for the production of which the workpiece 21 currently arranged in the workpiece holder 23 is to be processed further, and/or an application of the sensor to be produced can be provided to the control unit 30. This can, for example, take place via an input by an operator. Alternatively, the workpiece can be provided with an identification that can be read by the digital camera or an additional reader connected to the control unit 30. In this case, the digital camera 29 or the reader can read the identification at the beginning of the process and transmit the information to the control unit 30. Said control unit can further process the information and identify the sensor type or the application, based upon the information. Based upon the specified sensor type or the specified application, the control unit 30 can execute a specific processing program stored in a storage means of the control unit 30, which program is used to control the device 20 in order to produce a diaphragm with the desired properties.

If, for example, a specific average pore size and pore density are desired for the specified sensor type in order to later, during the measuring operation, allow a sufficient flow of fluid through the diaphragm, the control unit 30 controls the laser accordingly, in order to introduce sufficient energy into the diaphragm body 22 for the pores of the diaphragm body 22 to be enlarged. In order to improve the introduction of thermal energy into the diaphragm body 22, said diaphragm body can have additives that absorb the energy introduced by means of the beam bundle 26 and convert it into heat. Advantageously, the diaphragm body 22 is heated in the region to be processed by means of the laser 24 to a temperature that is in the range of the sintering temperature or above the sintering temperature of the ceramic material from which the diaphragm body 22 is made.

In order to process the diaphragm body 22 by means of the beam bundle 26, the workpiece holder 23 and the beam bundle 26 can be moved relative to one another. Based upon the determined position of the diaphragm body 22, the control unit 30 can operate the drive 25 of the workpiece holder 23 and/or the drive 28 of the deflection mirror 27, such that the beam bundle 26 is deflected onto a region to be processed of the diaphragm body 22. In this way, even larger regions of the diaphragm body 22 can be scanned. It is also possible in this way to focus the beam bundle 26 into an inner region of the diaphragm body 22.

In another method variant, which can be performed alternatively or additionally to the first method variant, the control unit 30 can also determine, based upon the image data, whether the shape and length of the diaphragm body 22 and its orientation with respect to the tube wall of the workpiece 21 match appropriate specified values. The values specified for a respective sensor type can be stored in a storage means of the control unit 30. If the diaphragm body 22 is too long, or if it protrudes too far beyond the wall of the workpiece 21, the control unit 30 can operate the laser 24 and the drives 25, 28, in order to shorten the diaphragm body 22 to the desired length.

A variety of method variants are conceivable. For example, the workpiece can be made of a plastic material, such as PEEK, and the diaphragm body can be firmly bonded to the wall of the workpiece by insert molding. In this embodiment, the method above can also be used, or the subsequent processing of the diaphragm body by means of the device described above is also possible.

What is claimed is:

1. A method, comprising:
   providing a workpiece for an electrochemical sensor, wherein the workpiece includes a wall with a continuous opening extending through the wall;
   providing a diaphragm body, wherein the diaphragm body is made from a porous ceramic;
   affixing the diaphragm body in the opening such that the diaphragm body completely fills a cross-section of the opening; and
   after the affixing, processing the diaphragm body using a laser so that a property of the diaphragm body is changed,
   wherein the porous ceramic of the diaphragm body includes one or more materials mixed within the ceramic that facilitate the processing of the diaphragm body using the laser.

2. The method according to claim 1, further comprising:
   temporarily fixing the workpiece in a workpiece holder; and
   moving a beam emitted by the laser and the workpiece holder relative to one another during the processing so that the beam strikes at least a section of the diaphragm body.

3. The method according to claim 1, further comprising:
   detecting optically a position and an orientation of the diaphragm body.

4. The method according to claim 3, wherein the optical detection of the position and the orientation of the diaphragm body includes:
   acquiring image data using an image acquisition device of a region of the wall where the diaphragm body is disposed; and
   analyzing the image data using an electronic data processing unit configured to determine the position and the orientation of the diaphragm body with respect to a specified coordinate system and/or with respect to the wall of the workpiece.

5. The method according to claim 4, wherein the workpiece with the diaphragm body and the beam are moved relative to one another based upon the determined position and orientation of the diaphragm body with respect to the specified coordinate system.

6. The method according to claim 1, wherein the diaphragm body is made from the ceramic which has pores, the pores having inner surfaces, and wherein the processing of the diaphragm body further comprises:
   introducing energy with the beam or beam bundle emitted by the laser into at least a section of the diaphragm body to reduce a total volume of the pores, a number of the pores, and/or an average cross-section of the pores, at least in the section.

7. The method according to claim 6, wherein the processing of the diaphragm body further comprises applying a coating to a surface of the diaphragm body and/or to at least a section of the inner pore surfaces of the diaphragm body.

8. The method according to claim 1, wherein the diaphragm body is made from the ceramic, and wherein the processing of the diaphragm body further comprises:
   introducing energy with the beam or beam bundle emitted by the laser into at least a section of the diaphragm body and forming and/or enlarging cavities, pores, and channels within the section of the diaphragm body.

9. The method according to claim 1, wherein the diaphragm body includes a slip or a ceramic precursor material, and wherein the processing of the diaphragm body further comprises:
   sintering the diaphragm body to form a ceramic from the slip or the ceramic precursor material.

10. The method according to claim 1, wherein the processing of the diaphragm body further comprises:
   cutting the diaphragm body to a specified length using the laser.

11. The method according to claim 1, wherein the diaphragm body includes one or more materials that, under the influence of the processing by the laser, effect a chemical modification of the diaphragm body or produce an electron conductivity of the diaphragm body.

12. The method according to claim 1, wherein the workpiece has a tube, and wherein the wall is a wall of the tube surrounding a lumen of the tube.

13. The method according to claim 1, wherein the workpiece is made of glass.

14. The method according to claim 1, wherein the porous ceramic is a ceramic comprising zirconium dioxide.

15. The method according to claim 14, wherein the one or more materials mixed with the ceramic that facilitate the processing using the laser absorb energy introduced by the laser and convert the energy into heat.

* * * * *